2 Sheets—Sheet 1.

A. C. KRUEGER.
Machine for Treating Raw Hide.

No. 217,803. Patented July 22, 1879.

WITNESSES
Nat. E. Oliphant.
Geo. R. Porter.

INVENTOR
August C. Krueger.
per Chas. H. Fowler,
Attorney.

A. C. KRUEGER.
Machine for Treating Raw Hide.

No. 217,803. Patented July 22, 1879.

WITNESSES
Nat. E. Oliphant
Geo. R. Porter

INVENTOR
August C. Krueger,
per Chas. H. Fowler,
Attorney.

UNITED STATES PATENT OFFICE.

AUGUST C. KRUEGER, OF CHICAGO, ILLINOIS.

IMPROVEMENT IN MACHINES FOR TREATING RAW HIDES.

Specification forming part of Letters Patent No. 217,803, dated July 22, 1879; application filed June 7, 1879.

*To all whom it may concern:*

Be it known that I, AUGUST C. KRUEGER, of Chicago, in the county of Cook and State of Illinois, have invented a new and valuable Improvement in Machines for Treating Raw Hides; and I do hereby declare that the following is a full, clear, and exact description of the construction and operation of the same, reference being had to the annexed drawings, making a part of this specification, and to the letters and figures of reference marked thereon.

Figure 1:
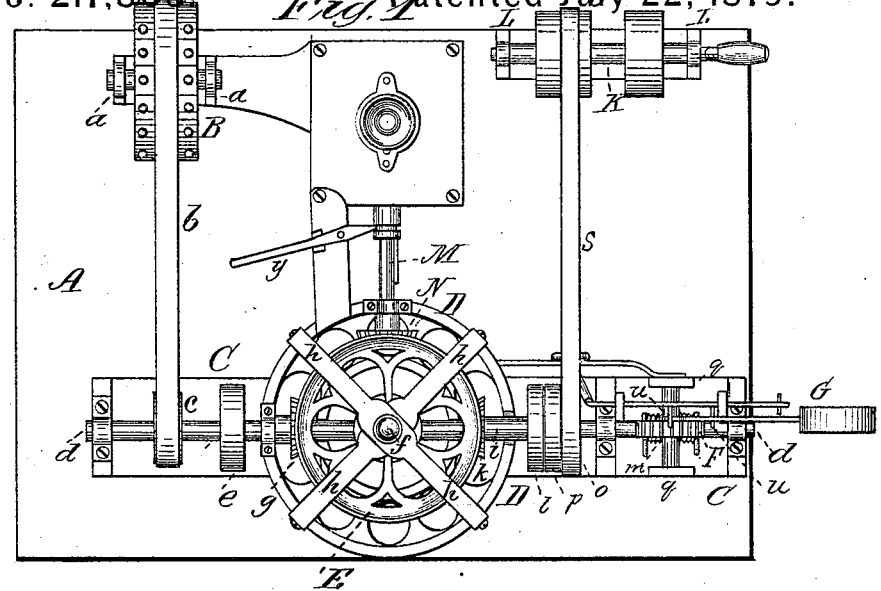
Figure 2:
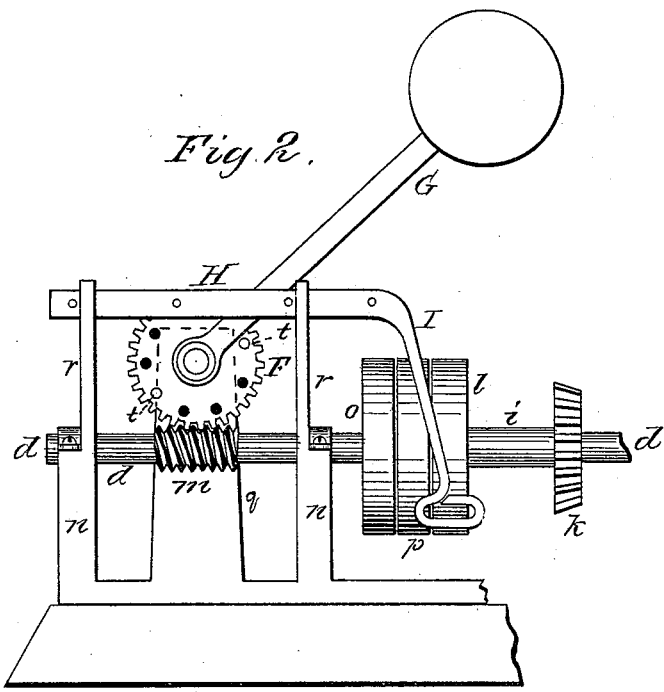
Figure 3:
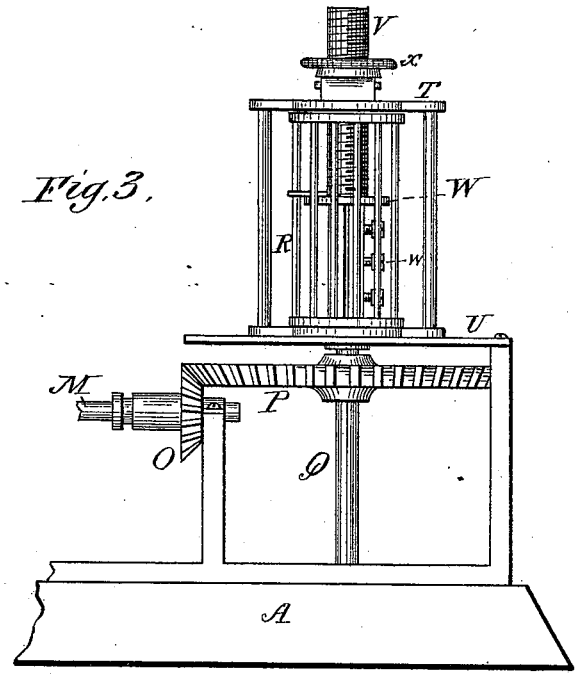
Figure 4:
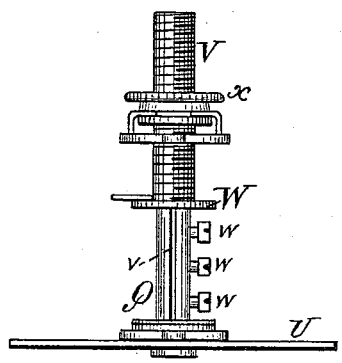
Figure 5:
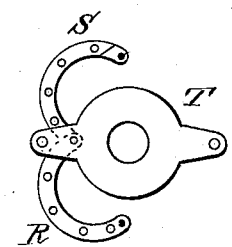

Figure 1 of the drawings is a representation of a top-plan view of my invention. Fig. 2 is a detail view, on an enlarged scale, of the mechanism for changing motion; Figs. 3, 4, and 5, detail views of the cage and its connecting parts.

The present invention has relation to machines for treating raw hides; and consists in the peculiar arrangement and construction of the several parts, as will be hereinafter described, and subsequently pointed out in the claims.

In the accompanying drawings, A represents the floor or suitable base, to which the several parts of the machine are securely connected. A drum, B, is journaled in suitable bearing a, said drum having a belt, b, passing over it. The belt b also passes over a pulley, c, keyed or otherwise rigidly secured to a horizontal shaft, d, having its bearings in a metal frame, C, said shaft also carrying a pulley, e.

The frame C is cast with or has secured thereto an arbor, D, which forms a bearing for a vertical central shaft, f, to the upper end of which is journaled a horizontal gear-wheel, E, the teeth of said wheel meshing with the teeth upon a beveled-gear wheel, g, secured to the shaft d. The arbor D has secured to its sides braces h, which cross each other over the axis of the wheel E, and through which passes the central shaft, f. The shaft d, after passing through the arbor D, enters an annular sleeve, i, or short hollow shaft having secured to its inner end a beveled-gear wheel, k, similar to the wheel g, which also gears with the horizontal wheel E.

To the opposite or outer end of the sleeve i is rigidly secured a pulley, l. The shaft d, after passing through the sleeve i, terminates in a worm-screw, m, that portion of the shaft upon each side of the worm-screw m having its bearings in supports n. The shaft d has rigidly connected to it a pulley, o, and between it and the pulley l is a loose pulley, p. With the worm m gears a spur-wheel, F, having its bearing in supports q, and carrying a weighted lever, G, pivoted or otherwise connected to the shaft of the wheel F, so that it can shift its position, as will be described hereinafter.

A sliding bar, H, is supported in uprights r, and carries a belt-shifter, I. This belt-shifter is of the usual construction, bent at its lower end to form a loop, through which the belt s passes, after passing over the pulley J upon a shaft, K, said shaft being supported in standards L. The lever G is shifted from a vertical position to either the right or left by pins t upon the inner face of the wheel F, which come in contact with the lever during the revolution of the wheel, causing the lever to fall from a vertical line to the right or left, as the case may be. The belt-shifter I in the sliding of the bar H causes the belt s to shift from one to the other of the two pulleys l o, the bar H being caused to slide in either direction by the pins u, against which the lever is brought in contact.

At right angles to the shaft d is a shaft, M, provided with a beveled-gear wheel, N, meshing with the teeth upon the horizontal wheel E. To the opposite end of the shaft M is another gear-wheel, O, which engages with a large horizontal gear-wheel, P, rigidly secured to a vertical shaft, Q, the lower end having its bearing in the frame C. That portion of the shaft Q above the wheel P is formed with a slot, v, extending through it, and having set-screws w, for holding the raw hide within the slot.

The cage consists of two sections, R S, pivoted or hinged to a frame, T, said frame being securely fastened to a table, U, above the gear-wheel P. The sections R S are held closed by pins, or any other suitable locking device or means may be employed for securing the sections together and admitting of their ready separation when required.

A sleeve, V, carrying a disk or plate, W, is arranged to slide in a vertical direction upon the shaft Q, and its movement is controlled by the thumb-screw x; or other convenient means may be employed for raising or lowering the sleeve, the object thereof being to regulate the pressure upon the hides while in the cage.

The operation of the machine is as follows: The sections R S being opened, the hides are passed through the slot v of the shaft Q, and secured thereto by the screws w, after which the sections composing the cage are closed and fastened.

The machine is now set in motion by steam-power, or any other power desired, and by the arrangement of gear-wheels upon the shafts d M, in connection with the large horizontal wheels E P, the shaft Q, with the hides attached, is caused to rotate, winding the hides around the shaft until they are all drawn within the cage. The motion of the shaft Q is now reversed by the pins t upon the spur-wheel F coming in contact with the weighted lever G, which causes it to change its position, and also causes the bar H to slide, by reason of the lever striking against the fingers u upon said bar. The belt-shifter I now carries the belt from one to the other of the two pulleys l o, it first passing over and upon the loose pulley p, whereby the motion is reversed, causing the hides to be unwound from the shaft Q to their full length and the motion again reversed, thereby keeping the hides constantly moving in this manner until they are pliable and thoroughly worked through.

If desired, the cog or gear wheel O may be so connected to the shaft that it can, by a suitable lever, y, be thrown out of gear with the wheel P, so that as many cages as may be necessary can be set to the same power and used or not, as found desirable.

The drum B is for stuffing leather and laundry purposes, and is provided with a suitable door at its side and projecting bars or pegs upon its interior periphery, to increase the agitating effect upon the hides or leather within the drum.

The shaft of the drum B may be made hollow for the admission of steam thereto. The drum, as will be understood, has the same change of motion as does the shaft Q.

Having now fully described my invention, what I claim as new, and desire to secure by Letters Patent, is—

1. The combination, with the cage composed of the hinged sections R S, of the slotted shaft Q, set-screws w, and the plate W, secured to a screw-sleeve, V, fitting over the shaft Q and operated by the thumb-screw x, substantially as and for the purpose set forth.

2. In a machine for treating raw hides, the combination, with the shaft d, having worm m, and the spur-wheel F, with pins t, of the weighted lever G, sliding bar H, with fingers u, and the belt-shifter I, substantially as and for the purpose set forth.

In testimony that I claim the above I have hereunto subscribed my name in the presence of two witnesses.

AUGUST C. KRUEGER.

Witnesses:
F. A. JOHNSON,
WM. N. PREBLE.